United States Patent
Kim et al.

(10) Patent No.: US 7,247,599 B2
(45) Date of Patent: Jul. 24, 2007

(54) PREFERENTIAL OXIDATION CATALYST AND PROCESS FOR PREPARING THE SAME

(76) Inventors: Moon Chan Kim, 858-201, Yongieong-dong, sangdang-gu, Cheongju-si, Chungcheongbuk-do 360-182 (KR); In Hyuk Son, 386-2, Singok 2-dong, Uijeongbu-si, Gyeonggi-do (KR)

( * ) Notice: Subject to any disclaimer, the term of this patent is extended or adjusted under 35 U.S.C. 154(b) by 68 days.

(21) Appl. No.: 10/934,298

(22) Filed: Sep. 3, 2004

(65) Prior Publication Data

US 2006/0052244 A1    Mar. 9, 2006

(51) Int. Cl.
*B01J 23/00* (2006.01)
*B01J 23/40* (2006.01)
*B01J 23/42* (2006.01)
*B01J 23/44* (2006.01)

(52) U.S. Cl. ............... 502/325; 502/327; 502/334; 502/339

(58) Field of Classification Search ........... 502/325, 502/327, 334, 339
See application file for complete search history.

(56) References Cited

U.S. PATENT DOCUMENTS

| | | | | |
|---|---|---|---|---|
| 2,658,028 A | * | 11/1953 | Schmerling et al. | 208/138 |
| 2,818,394 A | * | 12/1957 | Murray et al. | 502/334 |
| 3,216,783 A | * | 11/1965 | Cohn | 423/247 |
| 4,943,550 A | * | 7/1990 | Kolts et al. | 502/327 |
| 6,093,670 A | * | 7/2000 | Brown | 502/50 |
| 6,132,689 A | | 10/2000 | Skala et al. | 422/193 |
| 6,190,623 B1 | | 2/2001 | Sanger et al. | 422/192 |
| 6,207,122 B1 | | 3/2001 | Clawson et al. | 423/418.2 |
| 6,299,995 B1 | * | 10/2001 | Abdo et al. | 429/17 |
| 6,573,214 B2 | * | 6/2003 | Abdo et al. | 502/332 |
| 6,790,432 B2 | * | 9/2004 | Ruettinger et al. | 423/656 |
| 2003/0083196 A1 | * | 5/2003 | Korotkikh et al. | 502/326 |
| 2004/0048114 A1 | * | 3/2004 | Shore | 429/19 |
| 2004/0258598 A1 | * | 12/2004 | Yao et al. | 423/247 |

* cited by examiner

Primary Examiner—J. A. Lorengo
Assistant Examiner—Patricia L. Hailey
(74) Attorney, Agent, or Firm—Renner, Otto, Boisselle & Sklar, LLP

(57) ABSTRACT

Disclosed is a process for preparing a stable PROX reaction catalyst, comprising the steps of (a) preparing a catalyst platinum supported on alumina; (b) calcinating the catalyst from step (a) at 300~600° C. for 2~4 hours; (c) contacting the catalyst obtained from step (b) with hydrogen at 300° C.~600° C. for 2~4 hours to reduce the catalyst; and (d) dropping the temperature in the reduced catalyst from step (c) to less than 100° C. and then contacting the catalyst with a predetermined solvent and/or gas while elevating the temperature to 300° C.–600° C. The catalyst has Pt—Al arrangement, the content of Pt being 0.5~7% by weight and has an overall shape of an oval.

9 Claims, 8 Drawing Sheets

Pt 4d XPS spectra (left) and deconvolution of Pt 4 $d^{5/2}$ XPS spectra (right)

Pt 4d XPS spectra (left) and deconvolution of Pt 4 $d^{5/2}$ XPS spectra (right)

H$_2$-TPD spectra of the catalyst of the prior art

H₂-TPD spectra of the catalyst of the present invention (W5Pt/Al)

$H_2$-TPR spectra of Used W5Pt/Al (reaction at 200°C in a 1% $O_2$ and 1% CO balanced in $H_2$ for 1 hour) and W5Pt/Al (stayed for 10 minutes (dash) or 30 minutes (solid) before increasing temperatures) in 5% $H_2$ balanced $N_2$ (Used W5Pt/Al, and W5Pt/Al were oxidized in 5% $O_2$ balanced $N_2$ for 20 minutes after reduction in $H_2$ for 1 hour at 500°C).

Comparison of $H_2$ consumption ratios between by spillover and by Pt reduction in $H_2$-TPR

PREFERENTIAL OXIDATION CATALYST AND PROCESS FOR PREPARING THE SAME

FIELD OF THE INVENTION

The present invention relates to an improved preferential oxidation catalyst used in a preferential oxidation of carbon monoxide, especially after steam reforming, and a process for preparing the same. More particularly, the present invention relates to a stable preferential oxidation catalyst for reducing the concentration of carbon monoxide to produce a treated fuel gas stream comprising less than about 50 ppm carbon monoxide, and a process for preparing the same. Also, the present invention relates to the use of a catalyst in a preferential oxidation of carbon monoxide.

BACKGROUND OF THE INVENTION

A fuel cell is an electrochemical device that converts chemical energy produced by a reaction directly into electrical energy. For example, one type of fuel cell includes a polymer electrolyte membrane (PEM) that permits only protons to pass between an anode and a cathode of the fuel cell. At the anode, diatomic hydrogen (a fuel) is reacted to produce protons that pass through the PEM. The electrons produced by this reaction travel through a circuitry that is external to the fuel cell to form an electrical current. At the cathode, oxygen is reduced and reacts with the protons to form water.

A typical fuel cell has a terminal voltage of up to approximately one DC volt. For purposes of producing much larger voltages, several fuel cells may be assembled together to form an arrangement called a fuel cell stack.

A fuel cell system may include a fuel processor that converts a hydrocarbon (e.g. methane) into a fuel flow for the fuel cell stack. Exemplary fuel processor systems are described in U.S. Pat. Nos. 6,207,122, 6,190,623 and 6,132,689, which are hereby incorporated by reference.

The two reactions which are generally used to convert a hydrocarbon fuel into hydrogen are shown in equation (1) and (2).

$$\tfrac{1}{2}O_2 + CH_4 \rightarrow 2H_2 + CO \quad (1)$$

$$H_2O + CH_4 \rightarrow 3H_2 + CO \quad (2)$$

The reaction shown in equation (2) is generally referred to as stem reforming. Both reactions may be conducted at a temperature from about 600° C. to 1,100° C. in the presence of a catalyst such as platinum (Catalytic Reformer). CO produced by these reactions is generally present in amounts greater than 10,000 ppm. Because of the high temperature at which the fuel processor is operated, this CO generally does not affect the catalyst in the fuel processor. However, if this reformate is passed to the prior arts fuel cell system operating at a lower temperature (e.g., less than 100° C.), the CO may poison the catalyst in the fuel cell by binding itself to catalyst sites, inhibiting hydrogen in the cell from reacting. In such systems it is typically necessary to reduce the CO levels to less than 100 ppm to avoid damaging the fuel cell catalyst. For this reason the fuel processor may employ additional reactions and processes to reduce the CO that is produced. For example, two additional reactions that may be used to accomplish this objective are shown in equations (3) and (4). The reaction shown in equation (3) is generally referred to as a Shift Reaction, and the reaction shown in equation (4) is generally referred to as a Preferential Oxidation (PROX).

$$CO + H_2O \rightarrow H_2 + CO_2 \quad (3)$$

$$CO + \tfrac{1}{2}O_2 \rightarrow CO_2 \quad (4)$$

Various catalysts and operating conditions are known for accomplishing the shift reaction. For example, the reaction may be conducted at a temperature from about 300–600° C. in the presence of supported platinum. Other catalysts and operating conditions are also known. Such systems operating in this temperature range are typically referred to as high temperature shift (HTS) systems. The shift reaction may also be conducted at lower temperatures such as 100–300° C. in the presence of other catalysts such as copper supported on transition metal oxides. Such systems operating in this temperature range are typically referred to as low temperature shift (LTS) systems. Other catalysts and operating conditions are also known. In a practical sense, typically the shift reaction may be used to lower CO levels to about 1,000–10,000 ppm, although in an equilibrium reaction it may be theoretically possible to drive CO levels even lower.

The PROX reaction may also be used to further reduce CO. The PROX reaction is generally conducted at temperatures lower than the shift reaction, such as at 100–200° C. The PROX reaction can also be conducted in the presence of an oxidation catalyst such as platinum or alternatively platinum supported on alumina (e.g., in the form of Al—O—Pt). The preparation of the latter catalyst comprises for example the steps of (a) washcoating a honeycomb with alumina ($Al_2O_3$) in the form of slurry, drying the washcoating and then impregnating the washcoating with platinum to produce a catalyst platinum supported on alumina and (b) calcinating the catalyst platinum supported on alumina obtained from step (a) at 300~700° C. This catalyst shows much difference in the ability of reducing the concentration of carbon monoxide in the PROX reaction depending on the amount of platinum used and its preparation. Nevertheless, these catalysts could not stably reduced about 1~6% of carbon monoxide under $H_2$ to less than 50 ppm. Thus, in the PROX reaction, there is a continuing need for a PROX reaction catalyst in which a PROX reaction catalyst can stably reduce the concentration of carbon monoxide to produce a treated fuel gas stream comprising less than about 50 ppm carbon monoxide.

SUMMARY OF THE INVENTION

Accordingly, it is an object of the present invention to provide a stable PROX reaction catalyst for reducing the concentration of carbon monoxide to produce a treated fuel gas stream comprising less than about 50 ppm carbon monoxide at temperatures lower than 300° C. and inhibiting the catalyst from inactivating.

It is another object of the present invention to provide a process for preparing the above-mentioned PROX reaction catalyst.

It is still another object of the present invention to use the catalyst in the PROX reaction for reducing the concentration of carbon monoxide contained herein to less than 50 ppm.

To accomplish these and other objects, the present invention provides in one aspect a process for preparing a stable PROX reaction catalyst, comprising the steps of:
(a) preparing a catalyst platinum supported on alumina;
(b) calcinating the catalyst from step (a) at 300~600° C. for 2~4 hours;
(c) contacting the catalyst obtained from step (b) with hydrogen at 300° C.~600° C. for 2~4 hours to reduce the catalyst; and
(d) dropping the temperature in the reduced catalyst from step (c) to less than 100° C. and then contacting the catalyst with a predetermined solvent and/or gas while elevating the temperature to 300° C.–600° C.

In step (a), the catalyst platinum supported on alumina may be prepared for example by washcoating a honeycomb with alumina in the form of slurry, drying it at a temperature of more than 100° C.; and impregnating the dry product with platinum and drying it at a temperature of more than 100° C.

Also, in step (a), the catalyst platinum supported on alumina may be prepared by using for example pellet, beads and powder as a carrier.

The preferred solvents used in step (d) have a H—O bond and/or a C—H—O bond. These solvents comprise, for examples, water ($H_2O$), alcohols (R—OH wherein R is from an alkyl group), ammonium hydroxide ($NH_4OH$), gasoline, hydrogen peroxide ($H_2O_2$) and hydrochloric acid (HCl) but are not limited to them. These solvents can be used alone or combination thereof.

The preferred gases used in step (d) have a H—O bond. These gases comprise, for examples, hydrogen ($H_2$), oxygen ($O_2$), ozone ($O_3$), methane ($CH_4$), propane ($C_3H_8$) and butane ($C_4H_{10}$) but are not limited to them. These gases can be used alone or combination thereof.

In another aspect, the present invention provides an improved stable PROX reaction catalyst prepared by the process of the present invention, having Pt—Al arrangement in the overall form of an oval, the content of Pt being 0.5~7% by weight.

The PROX reaction catalyst according to the present invention comprises platinum metal dispersed on an alumina carrier and has the shape of an oval rather than a sphere overall. As a result, the preferential oxidation catalyst has a stronger bond to oxygen than to carbon monoxide. Therefore, carbon monoxide adsorbed to platinum is easily desorbed in the presence of oxygen since oxygen is adsorbed to platinum in place of carbon monoxide. This will become obvious to those skilled in the art on reading FIG. 6.

According to the present invention, platinum is bound directly onto alumina in the form of Pt—Al in contrast to the catalyst of the prior art which is bound indirectly to alumina via an oxygen element in the form of Pt—O—Al. The Pt—Al structure induces an increase of the stability of platinum and thus inhibits an inactivation of the catalyst.

Also, according to the present invention, about 0.1~2% of the hydrogen is adsorbed onto the alumina, thereby giving a circumstance which the oxidized platinum on alumina can be reduced easily.

As used herein, the symbol "LR5Pt/Al" or "5Pt/Al" stands for the prior PROX reaction catalyst prepared by the traditional process, e.g., including the process mentioned above.

As used herein, the symbol "W5Pt/Al" stands for the PROX reaction catalyst according to the present invention.

As used herein, the expression "lower temperature" should be understood as a temperature lower than about 300° C. unless otherwise indicated.

As used herein, the expression "higher temperature" should be understood as a higher temperature than about 300° C. unless otherwise indicated.

DETAILED DESCRIPTION OF THE INVENTION

The present invention now will be described more fully hereinafter with reference to the accompanying drawings and tables below.

Figure 1:
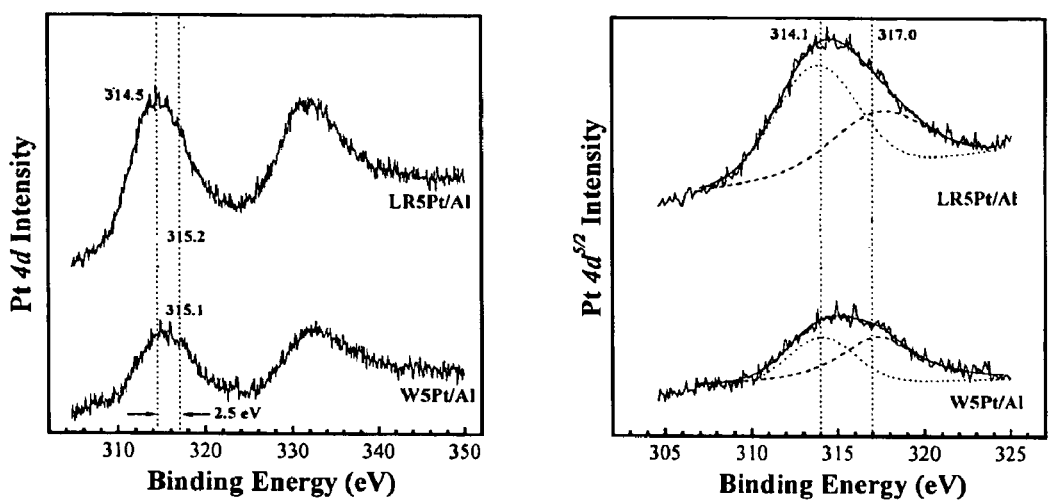
FIG. 1 is experimental data verifying that the preferential oxidation catalyst of the present invention (W5Pt/Al) has a Al—Pt arrangement, not a Al—O—Pt arrangement (LR5Pt/Al).

Referring to FIG. 1, it is evident that the PROX reaction catalyst of the present invention has Pt—Al arrangement, not Pt—O—Al of the prior catalyst. LR5Pt/Al catalyst stand for the prior catalyst and W5Pt/Al stands for the PROX reaction catalyst of the present invention. The left graph of FIG. 1 is Pt 4d XPS spectra (X-ray Photoelectron Spectroscopy) and the right graph represents the deconvolution of Pt $4d^{5/2}$ XPS spectra. In right graph, binding energy graph of Pt $4d^{5/2}$ electron orbital in W5Pt/Al catalyst is similar to metallic Pt LR5Pt/Al by immigration of +direction. This means that the PROX reaction catalyst of the present invention (W5Pt/Al) has Pt—Al arrangement, not Pt—O—Al of the prior catalyst. This Pt—Al arrangement in the PROX reaction catalyst of the present invention is also verified by the XPS line data given in Table 1 below. As shown in Table 1, the area ratios of dash lines of W5Pt/Al and LR5Pt/Al are 0.63 and 0.37, respectively. This data represents that the PROX reaction catalyst of the present invention is nearly similar to alloy in the form of Pt—Al. Pt—Al type of the PROX reaction catalyst induces an increase of the binding stability of platinum and thus inhibits the PROX reaction catalyst from inactivating.

TABLE 1

| | | XPS line data for catalysts | | | | | |
| --- | --- | --- | --- | --- | --- | --- | --- |
| | | Pt $4d^{5/2}$ | | | Al 2s | | |
| Catalyst | Peak | Main line | Dot line | Dash line | Main line | Dot line | Dash line |
| LR5Pt/Al | BE(eV) | 314.5 | 313.9 | 317.7 | 118.5 | 118.1 | 121.1 |
| | Area | 24449.76 | 15281.1 | 9168.7 | 26350.1 | 18099.6 | 8250.5 |
| | Area ratio | 1 | 0.63 | 0.37 | 1 | 0.69 | 0.31 |
| W5Pt/Al | BE(eV) | 315.1 | 314.1 | 317.3 | 119.1 | 118.9 | 122.1 |
| | Area | 14341.8 | 5378.2 | 8963.6 | 23489.8 | 17701.6 | 5788.2 |
| | Area ratio | 1 | 0.37 | 0.63 | 1 | 0.75 | 0.25 |

Figure 2:
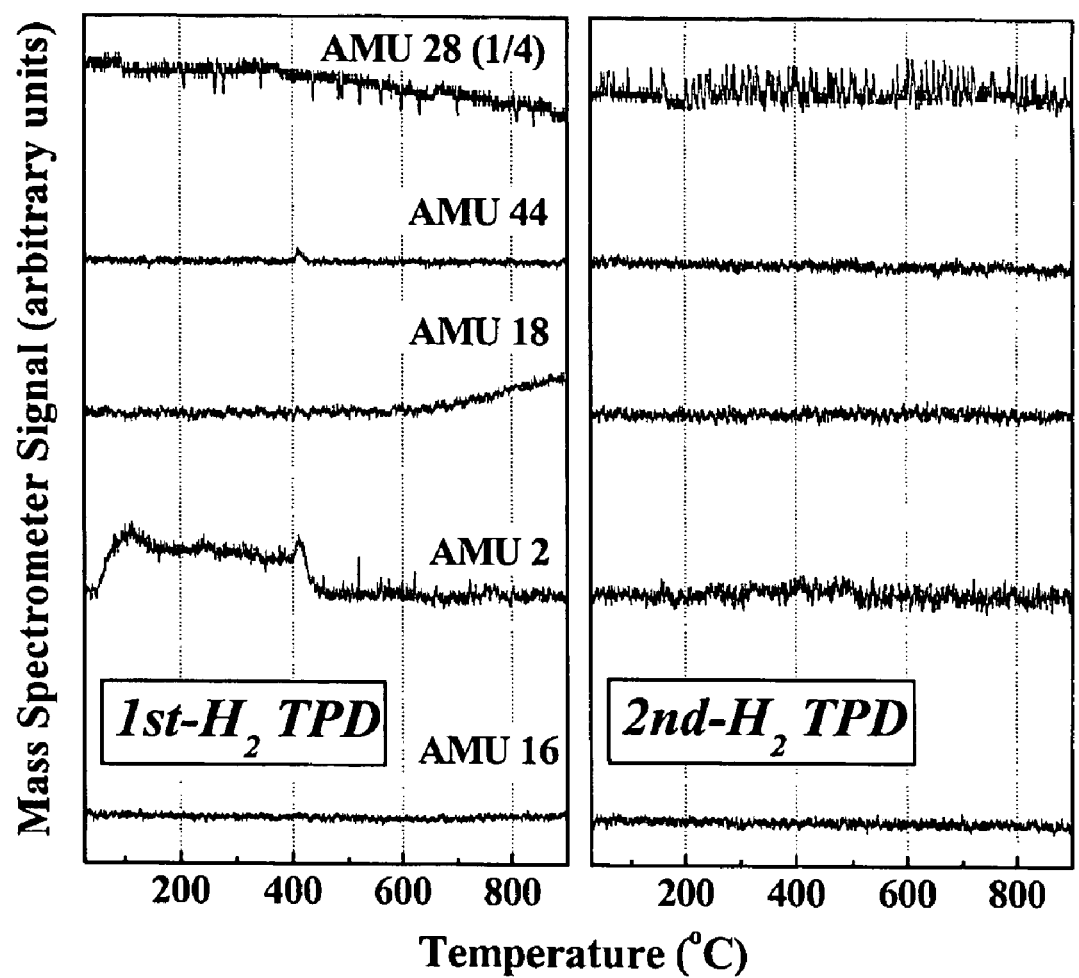
FIGS. 2 and 3 are experimental data showing that the PROX reaction catalyst of the present invention (W5Pt/Al) has a stronger adsorption of hydrogen than the prior catalyst (LR5Pt/Al).
Figure 3:
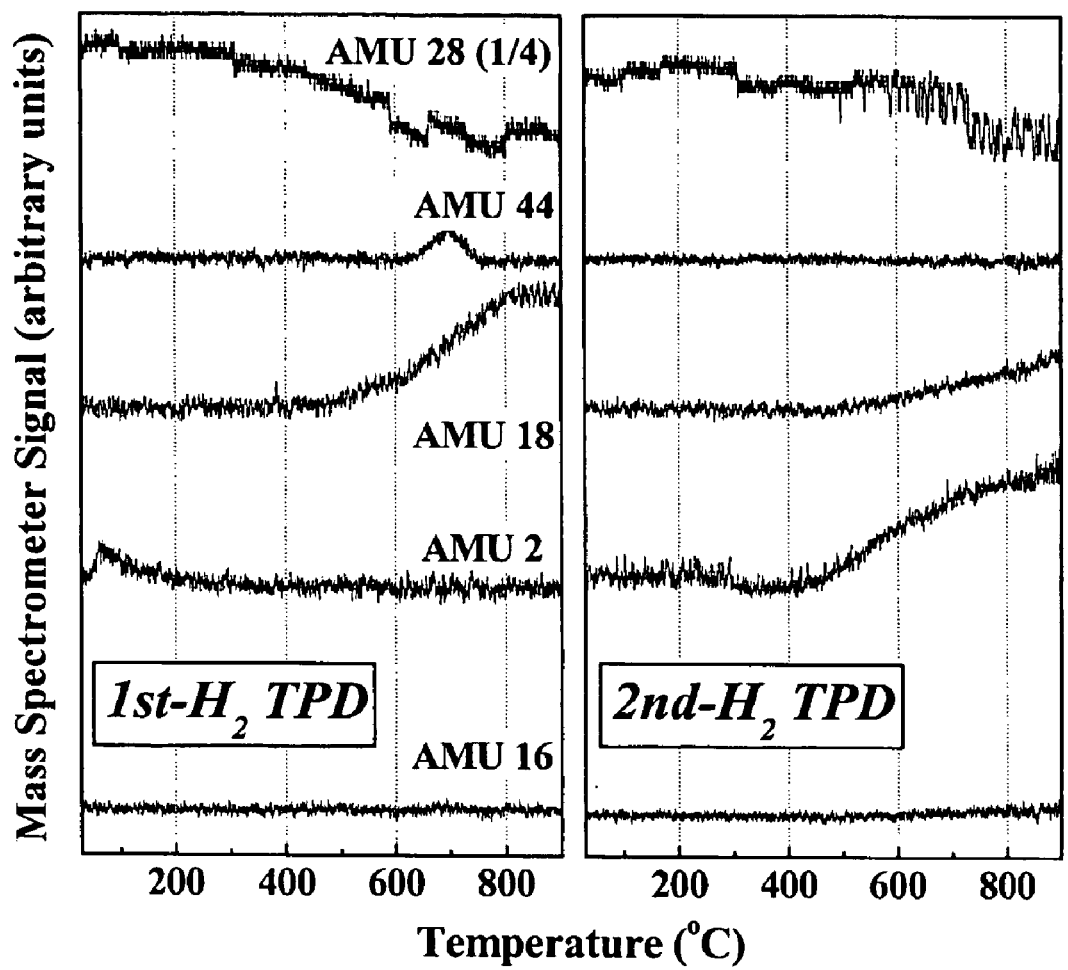

Referring to FIGS. 2 and 3, it is evident from the TPD (Temperature Programmed Desorption) that the PROX reaction catalyst of the present invention has large amount of hydrogen adsorbed more than the prior catalyst. This means that the surrounding hydrogen was spilled over onto the alumina in the PROX reaction catalyst of the present invention. This adsorption enables the oxidized platinum supported on alumina to easily be reduced.

Figure 4:
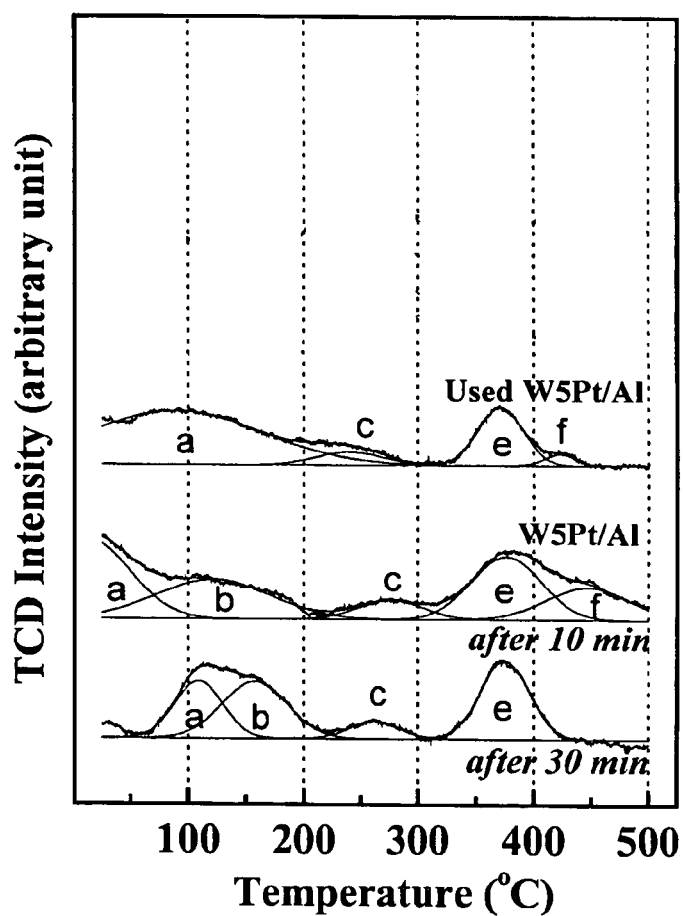
FIGS. 4 and 5 are experimental data showing the stability of the PROX reaction catalyst of the present invention (W5Pt/Al).
Figure 5:
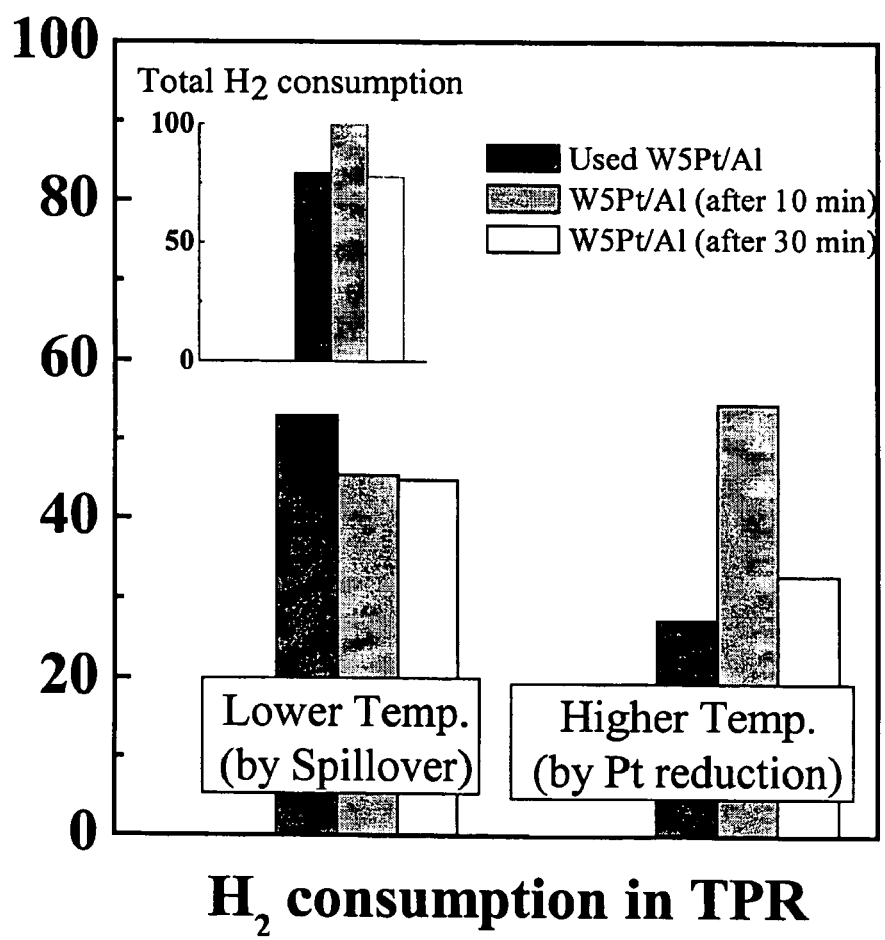

Also, referring to FIGS. 4 and 5, it is further evident that the PROX reaction catalyst of the present invention has a more stable structure of Pt—Al, due to higher peaks of the present catalyst, than the prior catalyst in TPR (Temperature Programmed Reduction).

Figure 6:
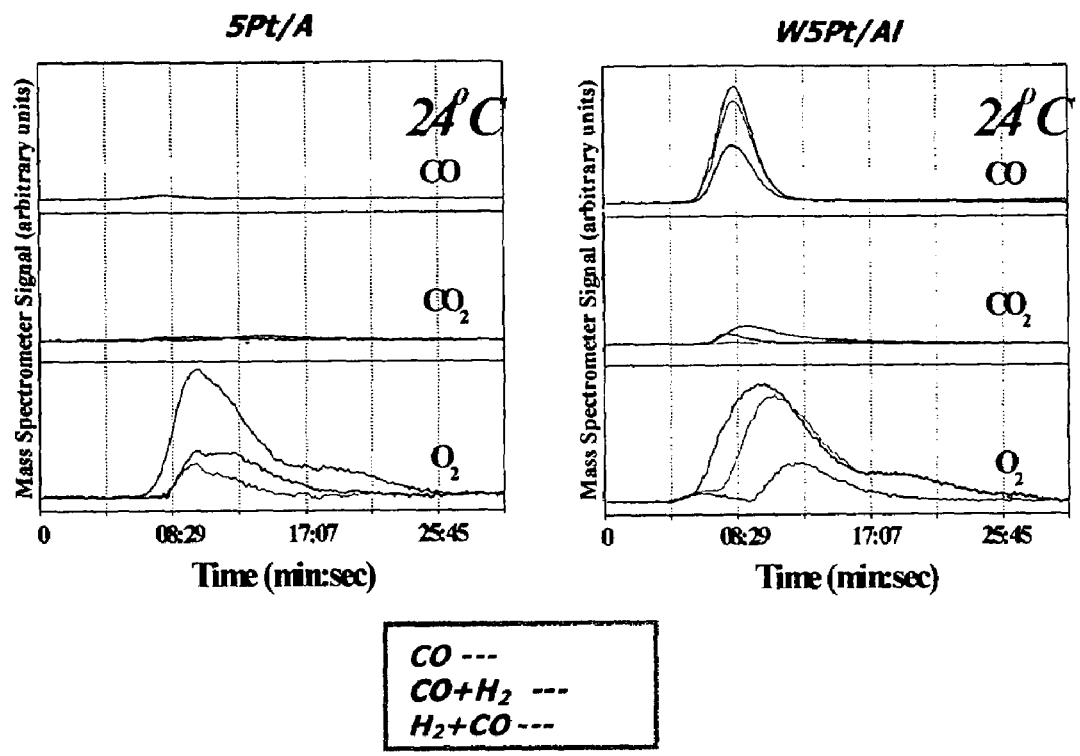
FIG. 6 is spectral data showing that the PROX reaction catalyst of the present invention has a stronger adsorption to oxygen rather than to carbon monoxide.

Referring to FIG. 6, the PROX reaction catalyst of the present invention has a strong adsorption on oxygen than monoxide.

Figure 7:
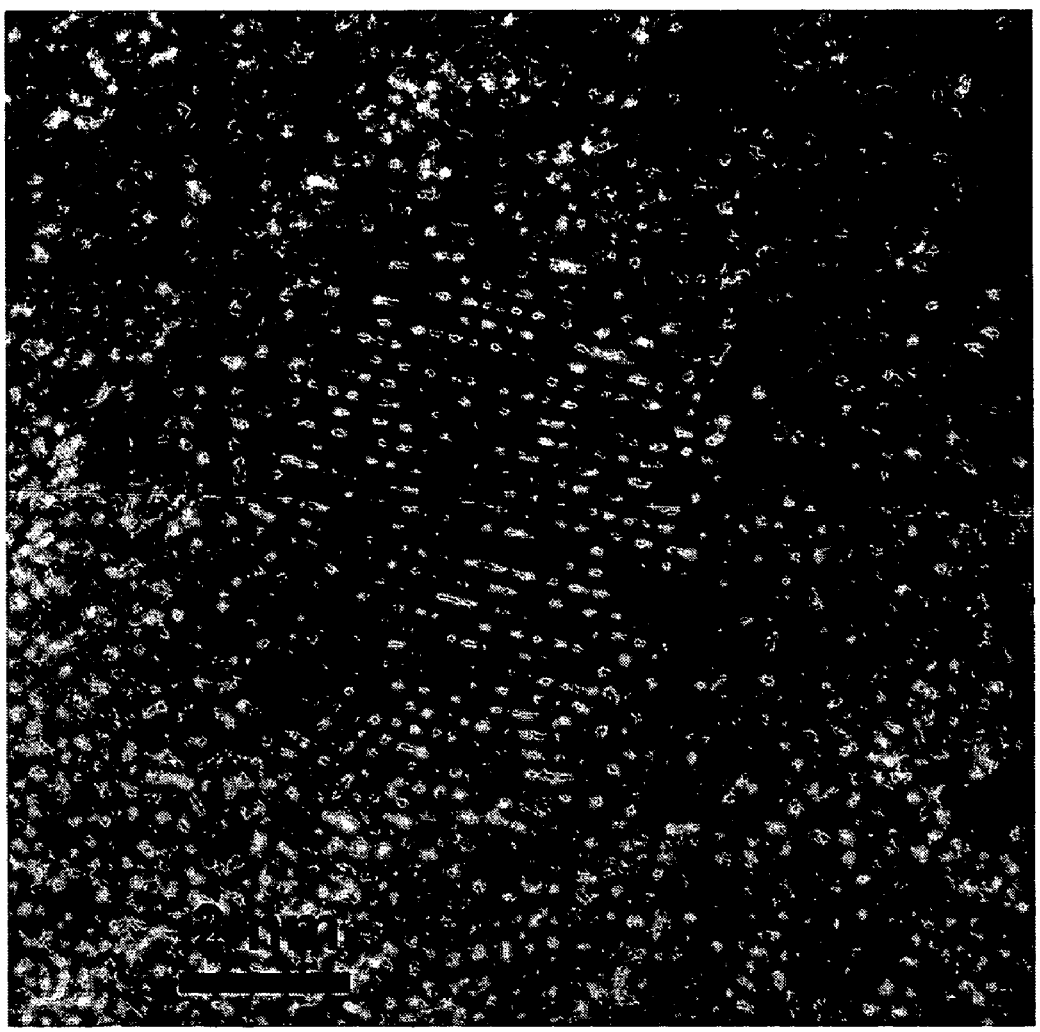
FIG. 7 is a microphotograph showing distribution of Pt metal in a Pt—Al alloy.

Referring to FIG. 7, the Pt metal in Pt—Al alloy type of the present invention is distributed in a size of less than 2 nm.

Figure 8:
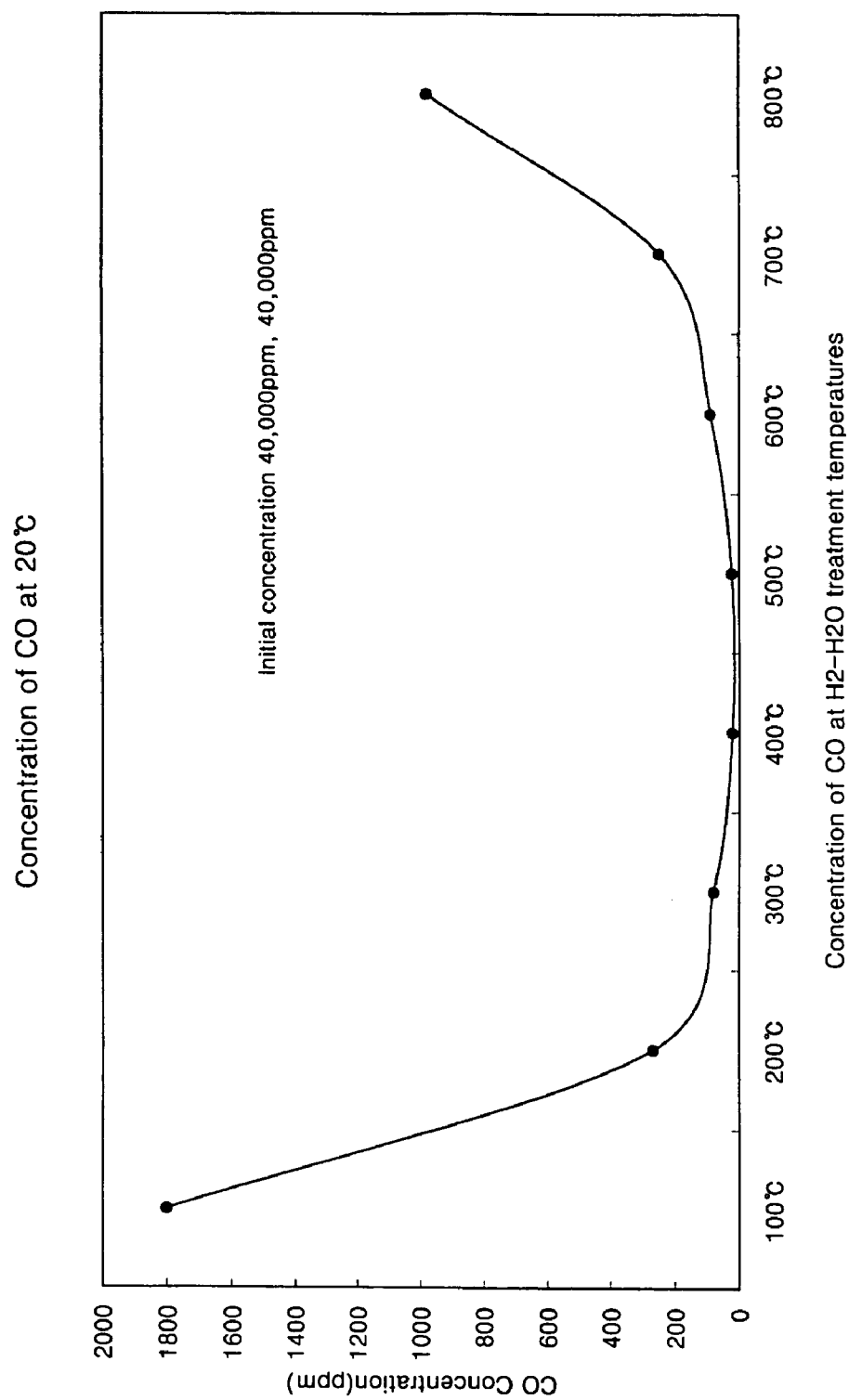
FIG. 8 is graphical data showing that the calcination temperature of the catalyst affects the conversion of carbon monoxide in the PROX reaction.

FIG. 8 is a graphical data showing that the calcination temperature of the catalyst affects the conversion of carbon monoxide in the PROX reaction. Referring to FIG. 8, it shows that the preferable calcination temperature in the preparation of a PROX reaction catalyst according to the present invention is between 300° C. and 600° C.

The present invention is further described in the following examples. These examples illustrate the invention only and are not to be construed as limiting the scope of the present invention in any way.

EXAMPLES

Examples 1~5 are to prepare the PROX reaction catalyst according to the process of the present invention varying the kinds of solvents and gases and the relevant amounts thereof and then to conduct the preferential oxidation for reducing the CO levels at temperatures lower than 300° C. in the presence of the PROX reaction catalyst. The used solvents and gases are also listed in Table 2 below and the evaluation of the catalysts prepared by the process of the present invention is given in Table 3 below.

Comparative Example 1 is to evaluate a performance of the catalyst prepared in the absence of water and gas treatment. The reactants used in Comparative Example 1 were 4.0% of carbon monoxide (CO), 10% of carbon dioxide ($CO_2$), 1% of methanol ($CH_3OH$), 4.1% of oxygen ($O_2$), and hydrogen as a balanced gas. The temperature used in the PROX reaction was between 20° C. and 200° C.

All of the following Examples and Comparative Examples were continuously conducted for 200 hours.

Example 1

Gamma alumina (200 g) was wet-ground with ball-mills for 20 hours to produce an aqueous alumina slurry and then a honeycomb (15 cm×15 cm×10 cm) having 200 gas communication cells per 1 $in^2$ was wetted into the alumina slurry. Excess slurry in the cell was blown off by compressed air. Then, this was dried at 120° C. for 12 hours and immersed in an aqueous chloroplatinate solution containing 10 g of platinum to allow 5% by weight of platinum (C) to be supported on the gamma alumina. The obtained catalyst was dried at 120° C. for 12 hours, calcinated at 500° C. for 2 hours and reduced with the use of hydrogen at this temperature for 2 hours. The reduced catalyst-carrying honeycomb was contacted with 10% of water (A), 1% of hydrogen (B) and nitrogen as a balanced gas by passage of them for 1 hour while increasing the temperature from the starting temperature of 80° C. to 400° C. and then dried for 1 hour to obtain the desired PROX catalyst. With the use of the obtained catalyst, the PROX reaction was conducted at temperatures lower than 300° C. as listed in Table 3. The results are presented in Table 3 below.

Example 2

The PROX reaction was conducted using a catalyst prepared by following the procedure of Example 1, but replacing component (A) with 10% of hydrogen peroxide ($H_2O_2$) and replacing component (B) with 1% of methane ($CH_4$).

Example 3

The PROX reaction was conducted using a catalyst prepared by following the procedure of Example 1, but replacing component (A) with 10% of ethanol ($C_2H_5OH$) and replacing component (B) with 1% of propane ($C_3H_8$).

Example 4

The PROX reaction was conducted using a catalyst prepared by following the procedure of Example 1, but replacing component (A) with 10% of ammonium hydroxide ($NH_4OH$) and replacing component (B) with 1% of butane ($C_4H_{10}$).

Example 5

The PROX reaction was conducted using a catalyst prepared by following the procedure of Example 1, but replacing component (A) with 10% of hydrochloric acid (HCl) and replacing component (B) with 1% of oxygen ($O_2$).

Example 6

The PROX reaction was conducted using a catalyst prepared by following the procedure of Example 1, but using platinum (C) in an amount of 0.5% by weight.

Example 7

The PROX reaction was conducted using a catalyst prepared by following the procedure of Example 1, but using platinum (C) in an amount of 7.0% by weight.

Comparative Example 1

Gamma alumina (200 g) was wet-ground with ball-mills for 20 hours to produce an aqueous alumina slurry and then a honeycomb (15 cm×15 cm×10 cm) having 200 gas communication cells per 1 $in^2$ was wetted into the alumina slurry. Excess slurry in the cell was blown off by compressed air. Then, this was dried at 120° C. for 12 hours and immersed in an aqueous chloroplatinate solution containing 10 g of platinum to allow 5% by weight of platinum to be supported on the gamma alumina. The obtained catalyst was dried at 120° C. for 12 hours, calcinated at 400° C. for 2 hours to give a catalyst treated honeycomb to be used as a contrast. With the use of this honeycomb, a preferential oxidation was conducted at a lower temperature. The results are presented in Table 3 below as well.

Comparative Example 2

The PROX reaction was conducted using a catalyst prepared by following the procedure of Example 1, but using platinum (C) in an amount of 0.4% by weight.

Comparative Example 3

The PROX reaction was conducted using a catalyst prepared by following the procedure of Example 1, but using platinum (C) in an amount of 7.1% by weight.

TABLE 2

Components (A), (B) and (C) and amounts therefor used in the above Examples and Comparative Examples

| Examples | (A) component | amount (%) | (B) component | Amount (%) | (C) platinum (% by weight) |
|---|---|---|---|---|---|
| Example 1 | water | 10% | hydrogen | 1% | 5 |
| Example 2 | hydrogen peroxide | 10% | methane | 1% | 5 |
| Example 3 | ethanol | 10% | propane | 1% | 5 |
| Example 4 | ammonium hydroxide | 10% | butane | 1% | 5 |
| Example 5 | hydrochloric acid | 10% | oxygen | 1% | 5 |
| Example 6 | water | 10% | hydrogen | 1% | 0.5 |
| Example 7 | water | 10% | hydrogen | 1% | 7.0 |
| Comparative 1 | — | — | — | — | 5 |
| Comparative 2 | water | 10% | hydrogen | 1% | 0.4 |
| Comparative 3 | water | 10% | hydrogen | 1% | 7.1 |

TABLE 3

The concentrations of CO after the PROX reactions were conducted at the temperatures listed below [GHSV(Space Velocity, 1/hr) = 50,000/hr (ppm in unit)]

| Examples | PROX temperatures | | | | |
|---|---|---|---|---|---|
|  | 20° C. CO (ppm) | 60° C. CO (ppm) | 100° C. CO (ppm) | 150° C. CO (ppm) | 200° C. CO (ppm) |
| Example 1 | 21 | 1 | 0 | 0 | 0 |
| Example 2 | 22 | 3 | 0 | 0 | 0 |
| Example 3 | 22 | 2 | 0 | 0 | 0 |
| Example 4 | 24 | 4 | 0 | 0 | 0 |
| Example 5 | 25 | 5 | 0 | 0 | 0 |
| Example 6 | 72 | 37 | 11 | 2 | 0 |
| Example 7 | 58 | 29 | 8 | 1 | 0 |
| Comparative 1 | 578 | 347 | 202 | 74 | 57 |
| Comparative 2 | 286 | 159 | 81 | 46 | 29 |
| Comparative 3 | 276 | 147 | 80 | 43 | 25 |

The PROX reaction catalyst according to the present invention has a high conversion of carbon monoxide in PROX reaction at temperatures lower than 300° C. Also, the PROX reaction catalyst according to the present invention has a long lasting activation, lasting even longer than 200 hours.

As mentioned above, although the present invention is described by referring to the examples, those skilled in the art will understand that there could be various changes and modifications to the present invention without departing from the scope and the spirit of the following claims.

What is claimed is:

1. A process for preparing an improved stable preferential oxidation catalyst, comprising the steps of:
    (a) preparing a catalyst comprising platinum supported on alumina;
    (b) calcinating the catalyst from step (a) at a temperature in the range from 300 to 600° C. for 2 to 4 hours;
    (c) contacting the catalyst obtained from step (b) with hydrogen at a temperature in the range from 300 to 600° C. for 2 to 4 hours to reduce the catalyst; and
    (d) dropping the temperature in the reduced catalyst from step (c) to less than 100° C. and then contacting the catalyst with one or more solvents together with one or more gases while elevating the temperature to a temperature in the range from 300 to 600° C.

2. The process as claimed in claim 1, wherein 0.5 to 7% by weight of platinum is supported on alumina.

3. The process as claimed in claim 1 wherein the one or more solvents used in step (d) are selected from a group consisting of water ($H_2O$), alcohols (R—OH wherein R is an alkyl group), ammonium hydroxide ($NH_4OH$), gasoline, and hydrogen peroxide ($H_2O_2$).

4. The process as claimed in claim 1 wherein the one or more gases used in step (d) are selected from a group consisting of hydrogen ($H_2$), oxygen ($O_2$), ozone ($O_3$), methane ($CH_4$), propane ($C_3H_8$) and butane ($C_4H_{10}$).

5. A catalyst for a preferential oxidation reaction prepared according to the process as claimed in claim 1, the catalyst having Pt—Al arrangement, the content of Pt being 0.5 to 7% by weight.

6. The catalyst as claimed in claim 5, wherein the catalyst has an overall shape of an oval.

7. The catalyst as claimed in claim 5, wherein 0.1 to 2% by weight of hydrogen is adsorbed on alumina, thereby reducing the oxidized platinum supported on alumina.

8. A process for preparing a preferential oxidation catalyst, comprising:
    (a) preparing a catalyst comprising platinum supported on alumina;
    (b) calcinating the catalyst from step (a) at a temperature in the range from 300 to 600° C. for 2 to 4 hours;

(c) contacting the catalyst obtained from step (b) with hydrogen at a temperature in the range from 300 to 600° C. for 2 to 4 hours to reduce the catalyst; and (d) dropping the temperature in the reduced catalyst from step (c) to less than 100° C. and then contacting the catalyst with one or more solvents together with one or more gases while elevating the temperature to a temperature in the range from 300 to 600° C., wherein the one or more solvents used in step (d) are selected from a group consisting of water ($H_2O$), alcohols (R—OH wherein R is an alkyl group), ammonium hydroxide ($NH_4OH$), gasoline and hydrogen peroxide ($H_2O_2$); and wherein the one or more gases used in step (d) are selected from a group consisting of hydrogen ($H_2$), oxygen ($O_2$), ozone ($O_3$), methane ($CH_4$), propane ($C_3H_8$) and butane ($C_4H_{10}$).

9. A catalyst made by the process of claim 1, the catalyst having a Pt—Al arrangement and an overall shape of an oval, the content of Pt being 0.5 to 7% by weight.

* * * * *